United States Patent
Trauninger

(10) Patent No.: US 7,367,676 B2
(45) Date of Patent: May 6, 2008

(54) FILM FEED MECHANISM IN A MOTION-PICTURE CAMERA

(75) Inventor: Walter Trauninger, Laab im Walde (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 227 days.

(21) Appl. No.: 10/519,320

(22) PCT Filed: Jun. 11, 2003

(86) PCT No.: PCT/DE03/01987

§ 371 (c)(1),
(2), (4) Date: May 20, 2005

(87) PCT Pub. No.: WO2004/003657

PCT Pub. Date: Jan. 8, 2004

(65) Prior Publication Data

US 2005/0206845 A1 Sep. 22, 2005

(30) Foreign Application Priority Data

Jun. 26, 2002 (DE) .............................. 102 29 380

(51) Int. Cl.
*G03B 1/00* (2006.01)
*G03B 21/48* (2006.01)
*G03B 1/24* (2006.01)
(52) U.S. Cl. .................. 352/166; 352/180; 352/184; 352/187
(58) Field of Classification Search ................ 352/166, 352/180, 184, 186–194
See application file for complete search history.

(56) References Cited

U.S. PATENT DOCUMENTS 3,524,573 A 8/1970 Kotler et al.

(Continued)

FOREIGN PATENT DOCUMENTS

DE 1 120 269 12/1961

(Continued)

OTHER PUBLICATIONS

English translation of the IPER for International application No. PCT/DE2003/001987, dated Oct. 12, 2004, in the name of Arnold & Richter Cine Technik GmbH & Co. Betriebs KG.

(Continued)

*Primary Examiner*—Rodney Fuller
(74) *Attorney, Agent, or Firm*—Christie, Parker & Hale, LLP

(57) ABSTRACT

A film mechanism for a motion-picture camera is provided. The film feed mechanism has a transport grip having a transport grip clip and at least one transport grip tip which engages in a sprocket hole of a motion-picture film that is transported at a predefinable film transport speed by the kinematics of the transport grip. The transport grip tip displaces the motion-picture film in an intermittent manner and runs through a closed trajectory whose reversing points determine the length of travel during the film transport. The kinematics of the transport grip can be dynamically and/or statically modified in accordance with the film transport speed by a modification to the relative positions of the transport grip and grip drive connected in an articulated manner to the transport grip in such a way that a constantly correct length of travel during a film transport step of the transport grip is guaranteed.

14 Claims, 4 Drawing Sheets

U.S. PATENT DOCUMENTS

| | | |
|---|---|---|
| 3,774,828 A | 11/1973 | Lach et al. |
| 3,791,566 A | 2/1974 | Fliesser |
| 4,003,647 A | 1/1977 | Kuppens |
| 4,402,581 A * | 9/1983 | Bauer .................. 352/192 |
| 4,801,906 A | 1/1989 | Morris et al. |
| 5,225,860 A | 7/1993 | Blaschek |

FOREIGN PATENT DOCUMENTS

| | | |
|---|---|---|
| DE | 1 199 127 | 8/1965 |
| DE | 39 318 | 8/1965 |
| DE | 20 42 891 | 3/1972 |
| DE | 38 35 329 | 4/1989 |
| DE | 38 35 829 | 12/1989 |

OTHER PUBLICATIONS

Weise; "Kinogeratetechnik" (Technology for apparatuses), Akademische Verlagsgesellschaft Geest & Porting D.-G., Leipzig C1, 1950, pp. 68-81 (partial translation previously filed).

* cited by examiner

FILM FEED MECHANISM IN A MOTION-PICTURE CAMERA

CROSS-REFERENCE TO RELATED APPLICATION

This application is a National Phase patent application of International Application Number PCT/DE2003/001987, filed Jun. 11, 2003, which claims priority of German patent Application Number 102 29 380.5, filed on Jun. 26, 2002.

BACKGROUND OF THE INVENTION

The invention relates to a film feed mechanism in a motion picture camera.

From DE 38 35 329 C1 a film feed mechanism is known in a motion picture camera which comprises a transport grip and a transport gearing. The transport grip consists of a transport grip clip which has at one end at least one transport grip tip which moves the motion film, which is to be transported and has a perforated edge, step by step past the exposure window. A center section of the transport grip clip is connected through an articulated grip joint to a crank which has in its rotational axis a drive shaft which is coupled to a film transport motor. The end of the transport grip clip opposite the transport grip tip is connected to a swing bar which can swivel about a swing axis and which is fitted with a locking grip which at the end of a film transport step owing to the contra movement of the locking grip and transport grip projects into a sprocket hole of the film perforation and secures the picture state of the motion film during exposure of the film picture.

The transport gear which is formed from the crank and the swing bar moves the transport grip so that the transport grip tip runs through an elongated curve which is closed per se and which at one end enters into the film running face and at the other end leaves it again so that the distance between the two reversing tips determines the length of travel of the transport grip and thus a film transport step.

In order to adapt the curved path of the transport grip tips and the engagement depth of the locking grip in the known film feed mechanism the swing bar axis of the swing bar which determines the mutual movement of the locking grip and the transport grip as well as the effective length of the swing bar and crank can be changed.

So that the motion film is always positioned at the correct place for the exposure of the film picture the transport grip must transport the motion film always exactly by the length of travel, i.e., the distance between the reversing points of the curved path which is described by the transport grip tips must be constant. As the length of travel of the transport grip tips changes, i.e. in the event of different length film transport steps not only does the distance of the exposed film pictures change relative to each other but the tip of the locking grip projecting into a corresponding sprocket hole of the moving film is no longer in exact alignment with the relevant sprocket hole and strikes an edge of the perforation and thereby damages the moving film.

Since considerable mass forces act on the transport grip tip at the reversing points of the curved path of the transport grip tip, this tip bends outwards at the reversing points in the sense of extending the curved path, i.e. with an upper reversing tip upwards and with a lower reversing tip downwards. This deformation of the transport grip tip results in an extension of the length of travel so that the distance between the film images which are to be exposed is changed and the film perforation is damaged through a locking grip which does not engage precisely in a sprocket hole.

Since the deformation of the transport grip tips increases as the transport speed of the film rises the length of travel also rises as the transport speed of the film increases so that owing to the faulty positioning of the moving film the position of the locking grip deviates more and more from the site of the associated sprocket hole resulting in more and more serious damage to the film.

SUMMARY OF THE INVENTION

The object of the present invention is to provide a film feed mechanism of the type already mentioned which ensures a constantly correct length of travel with each film transport step of the transport grip over the entire picture frequency range.

The solution according to the invention ensures a constantly correct length of travel of the transport grip over the entire picture frequency range and thus an exact mutual spacing between the film pictures which are exposed and are to be exposed of the motion picture film camera. By positioning the moving film with precision it is ensured that in a film feed mechanism with a locking grip the locking grip tip projects precisely into a sprocket hole at all film transport speeds so that damage to the moving film is avoided.

The solution according to the invention is based on the idea of compensating the unavoidable deformation of the transport grip tips resulting from the mass forces acting on same in dependence on the film transport speed and thus of producing and maintaining the predetermined exact length of travel.

The kinematics of the transport grip can be dynamically changed as the film transport speed changes or can be statically altered when setting the film transport speed. In a further variation the kinematics of the transport grip can be statically preset with the target for the desired film transport speed and can be combined with a dynamic regulation during film transport and changing film transport speed.

One advantageous embodiment of the solution according to the invention is characterised in that as the film transport speed rises the reversing points of the transport grip clip are moved towards each other. By changing the position of the transport grip clip it is possible with simple means to influence the upper and lower reversing point of the transport grip tip taking into account the mass forces which occur at the reversing points and thus to ensure a correct length of travel for the transport grip.

The kinematics of the transport grip are preferably changed by altering the relative position between the transport grip and a grip drive connected for articulated movement with the transport grip.

Alternatively or in combination with the aforesaid change in the kinematics the kinematics of the transport grip can be changed by shifting the attachment of the end of the transport grip clip opposite the transport grip tip on a control element which controls the projecting movement of the transport grip and a locking grip projecting into the film perforation at the end of a film transport step so that the locking grip releases the motion film again when the transport grip projects again into the film perforation.

More particularly the attachment of the transport grip on the control element can be shifted towards the axis of the control element as the film transport speed increases.

Changing the kinematics of the transport grip through intervention in the kinematics by adjusting suitable points of the kinematics can be carried out both electrically and mechanically.

An electrical adjustment of the kinematics of the transport grip is caused by changing an actuating signal sent by a camera control to an electrically actuated control member whereby the control member can consist of a servo motor which is connected directly or indirectly to the transport grip clip or the attachment on the control element. In order to change the kinematics of the transport grip the camera control can change the actuating signal continuously or discontinuously in dependence on the film transport speed.

A mechanical adjustment of the kinematics of the transport grip can take place by means of a mechanical control member connected to the grip drive or to the transport grip and preferably consisting of a centrifugal force regulator.

An alternative to this exists where during adjustment of a film transport speed the position of the grip drive is moved in relation to the transport grip or the connection between the grip drive and the transport grip is changed.

BRIEF DESCRIPTION OF THE DRAWINGS

The idea on which the invention is based will now be explained in further detail with reference to an embodiment illustrated in the drawings.

DETAILED DESCRIPTION OF THE DRAWINGS

Figure 1:
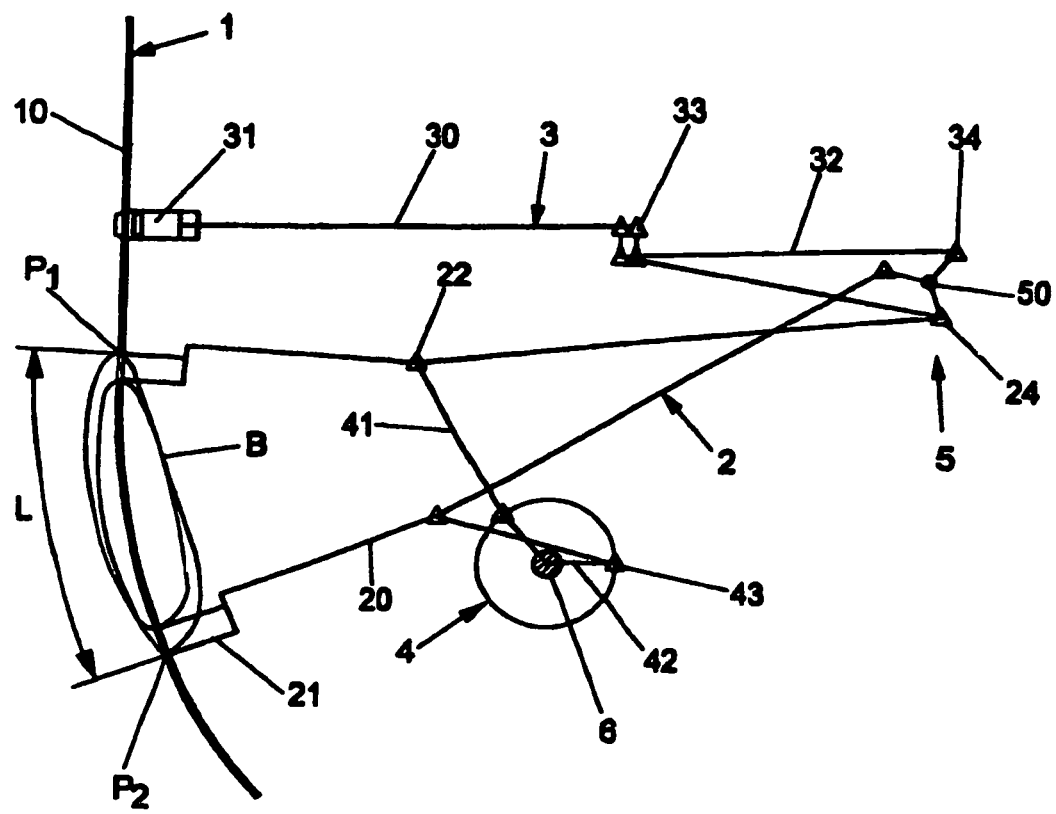
FIG. 1 shows a diagrammatic view of a film feed mechanism with the curved path of a transport grip.

The film feed mechanism illustrated diagrammatically in FIG. 1 serves to transport a moving film 1 whose edge or edges is/are provided with a perforation (sprocket holes) 10. The film feed mechanism has at least one transport grip 2 and at least one locking grip 3, i.e. either a transport and locking grip 2, 3 engaging in a perforation on one side, or two transport and locking grips 2, 3 which engage in perforations on both sides. Furthermore the film feed contains a film drive with a drive shaft 6 which is connected to a film transport motor (not shown in further detail), a crank 4 and a control element 5. The or each transport grip 2 and locking grip 3 is designed as a projecting grip and has at ends facing the moving film 1 one or more transport grip tips 21 or locking grip tips 31 which project alternately into the sprocket holes 10 of the moving film 1.

The at least one transport grip 2 has a transport grip clip 20 which at one end has a transport grip tip 21 and at the other end is connected to an attachment 24 on the control element 5 which swings or rotates about a control element axis 50. A center section of the transport grip clip 20 is connected through a grip joint 22 to a first crank arm 41 of the crank 4 which is connected through a crank joint 43 to a second crank arm 42 which is attached to the drive shaft 6.

The at least one locking grip 3 includes a locking grip pin 30 which has at one end the locking grip tip 31 and at the other end is connected through a locking grip clip 33 to a locking grip lever 32 which is attached through an attachment 34 to the control element 5.

The movement of the transport grip 2 during a film transport step is composed in accordance with the kinematics of the transport grip 2 described above of a horizontal movement and a vertical movement so that during transport of the moving film 1 the transport grip tip 21 describes the curved path B diagrammatically illustrated in FIG. 1. By connecting the transport grip clip 20 and the locking grip lever 32 at different connecting points 24, 34 on the control element 5 a mutual horizontal movement of the transport grip tip 21 and locking grip tip 31 is generated so that during a film transport step in which the moving film 1 is moved on by one film picture, the locking grip tip 31 is located outside of the film plane whilst the transport grip 21 is projected into the film sprocket 10 and moves the film 1 according to the predetermined length of travel L between an upper reversing point P1 and a lower reversing point P2.

At the end of a film transport step the transport grip 21 leaves the film sprocket 10 and the locking grip tip 31 projects into a sprocket hole 10 which is aligned with the locking grip tip 31 thereby ensuring a fixed picture state of the moving film 1 from which the part to be exposed is positioned in front of the picture window which is released during exposure of the film 1 through an aperture mounted in front of the picture window.

FIG. 1 shows the transport grip 2 in the two end positions when the transport grip tip 21 is located in the reversing points P1 and P2, and shows the locking grip 3 during projection of the locking grip tip 31 into the film perforation 10 or after leaving the film plane.

The pre-requirement for a correct picture state, i.e. a constant distance between two successive film pictures to be exposed is an exact observance of the length of travel L of the transport grip 2 between the upper reversing point P1 and the lower reversing point P2 of the curved path B. If the film feed mechanism is provided like the film feed mechanism illustrated in FIG. 1 with a locking grip 3, which need not necessarily be provided, then it is also necessary to observe the exact length of travel L equally also for a smooth handling of the moving film 1 so that the locking grip tip 31 projects into a sprocket hole 10 which is flush with same and does not owing to a faulty positioning of the moving film 1 strike the edge of a sprocket hole 10 or even a film web between two sprocket holes 10. A faulty positioning of the moving film 1 through the transport grip 2 would thus lead to considerable damage to the moving film 1.

The decisive feature for maintaining the exact length of travel L is the exact geometric positioning of the transport grip tip 21 at the upper and lower reversing points P1, P2. As a result of mass forces however a deformation of the transport grip tip 21 which is dependent on the film transport speed occurs at the reversing points P1 and P2 which leads to the transport grip tip 21 being bent upwards at the upper reversing point P1 and downwards at the lower reversing point P2. This deformation of the transport grip tip 21 as a result of mass forces results in an extension of the length of travel L as the film transport speed increases.

In order to ensure that particularly even with higher film transport speeds the correct length of travel L of the transport grip tip 21 is observed, according to the subject of the present invention an intervention is made in the kinematics of the transport grip 2 in dependence on the film transport speed so that the transport grip tip 21 exactly observes the upper and lower reversing point P1 and P2 respectively taking into account the mass forces which appear.

A change in the kinematics of the transport grip 2 can basically take place in many different ways. It is essential that the vertical motion components of the transport grip clip 20 is reduced as the film transport speed rises so that taking into account the mass forces engaging on the transport grip tip 21 and the resulting deformation of the transport grip tip 21 the position of the upper and lower reversing points P1, P2 of the transport grip tip 21 is observed.

Figure 2:
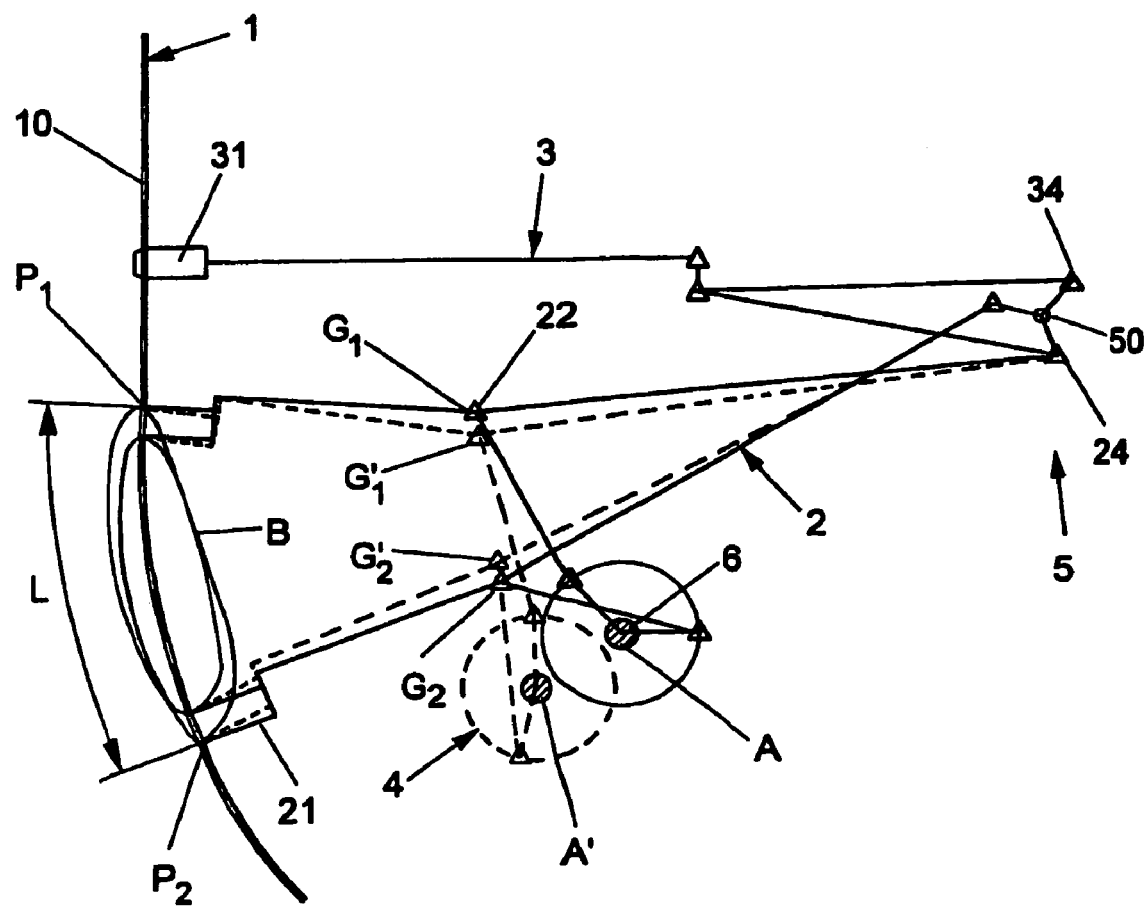
FIG. 2 shows a diagrammatic view of a change in the kinematics of the transport grip with different transport speeds through a displacement of the drive axis of a crank drive.

FIG. 2 shows a first possibility of compensating the extension of the length of travel L caused by the deformation of the transport grip tip 21, i.e. of counteracting a change in the film transport step caused by the deformation of the transport grip tip 21.

By extending the drive shaft 6 from position (point) A with slow film transport speed to position (point) A' with faster film transport speed a corresponding change is produced in the kinematics of the transport grip 2 which is shown in dotted lines in FIG. 2. Through this change in the kinematics an upper reversing point G1 of the articulated grip joint 22 is moved according to G1' and a lower reversing point G2 of the articulated grip joint 22 is moved according to G2' so that at higher film transport speeds the reversing points G1 and G2 of the articulated grip joint 22 are moved relative to each other.

An alternative to this form of compensation of a deformation of the transport grip tip 21 at higher film transport speeds is a change in the length of the crank arm so that similar to the illustration according to FIG. 2 a displacement of the upper and lower reversing points G1 and G2 of the grip joint 22 is caused.

Figure 3:
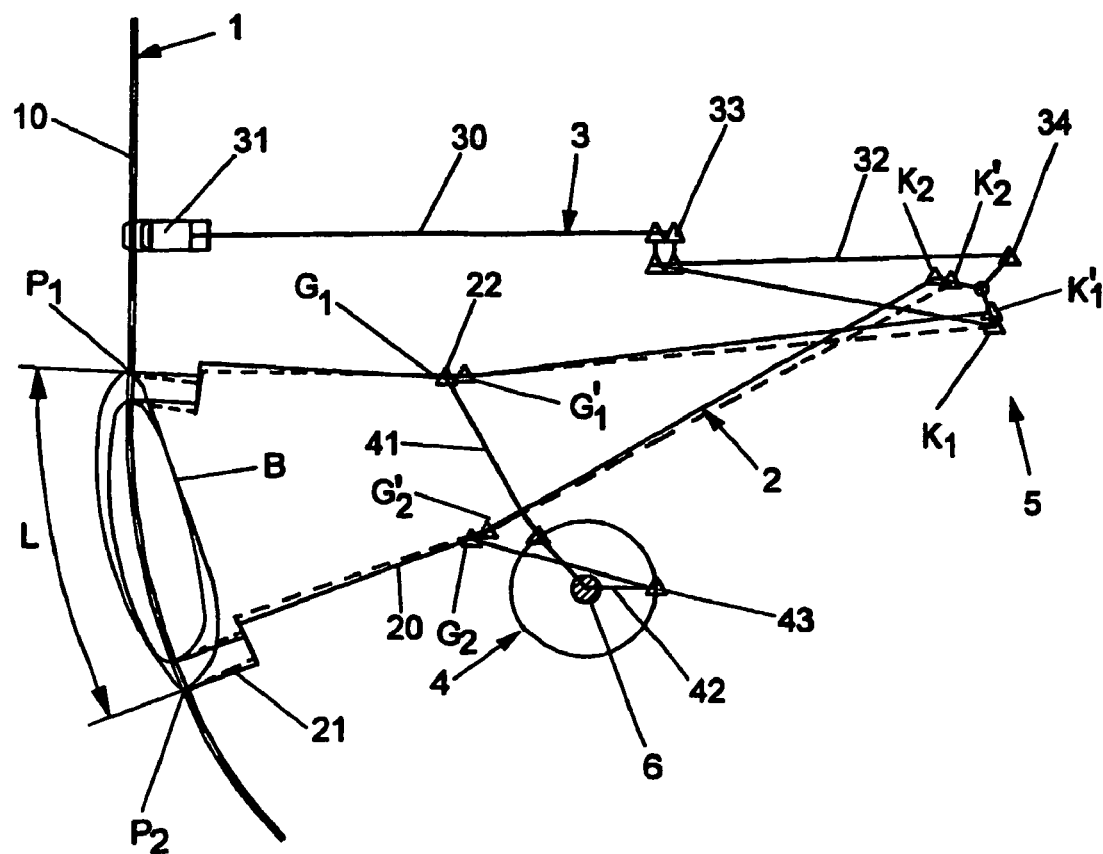
FIG. 3 shows a diagrammatic view of a change in the kinematics of the transport grip with different transport speeds through shifting the connection of the transport grip clip on a control element.

FIG. 3 shows a second variation of compensating the extension in the length of travel L caused by the deformation of the transport grip tip 21, i.e. of counteracting a change of film transport step caused by the deformation of the transport grip tip 21.

In this embodiment the kinematics of the transport grip 2 are changed by a shift in the attachment 24 of the end of the transport grip clip 20 opposite the transport grip tip 21 on the control element 5 in that for example as the film transport speed increases the attachment 24 to the control element axis 50 is moved, i.e. from point K (reversing point) to point (reversing point) K'. In the case of the upper reversing point P1 of the transport grip tip 21 the attachment 24 is thus located at point K1', whilst it is located in the case of the lower reversing point P2 at point K2'.

Both variations can also be combined with each other, i.e. a shift in the articulated grip joint 22 is linked with a shift in the attachment 24.

The shift in the drive shaft 6 from position A to position A' as well as of the attachment from point K to point K' illustrated in FIGS. 2 and 3 can take place both electrically and mechanically.

One possibility of moving the points A and K mechanically lies in connecting the switch for adjusting the film transport speed mechanically to a slider which moves the film drive during a change in the film transport speed so that there is the desired change illustrated in FIG. 2 of the kinematics of the transport grip 2. Empirically determined values can thereby be taken into consideration so that with a corresponding rise in the film transport speed the exact length of travel L of the transport grip 2 is observed.

An alternative embodiment consists in connecting the film drive to a centrifugal force regulator which in dependence on the film transport speed generates a continuous or stepped change in the position of the point A according to FIG. 2 and thus an approach of the reversing points G1 and G2 of the grip joint 22 as well as a continuous or stepped change in the position of point K according to FIG. 3 and thus a displacement of the reversing points K1 and K2 of the attachment of the transport grip clip 20.

Figure 4:
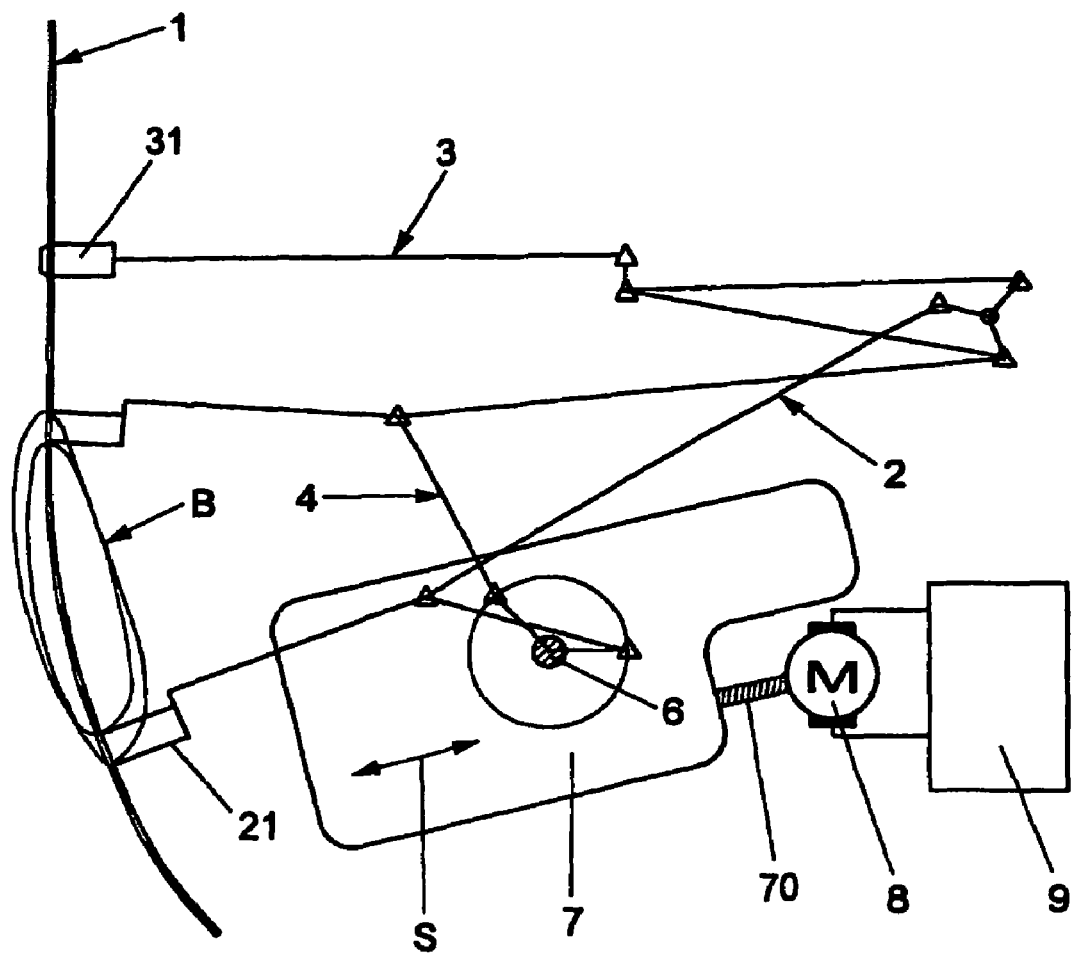
FIG. 4 shows a diagrammatic view of an electrical change in the kinematics of the transport grip by means of a servo motor and a speed-dependent actuating signal which is issued by the camera control.

FIG. 4 shows diagrammatically an electrical displacement of the position of the drive shaft 6 which is mounted together with the film transport motor (not shown) on a plate 7 which is connected to a servo motor 8 through an adjusting spindle 70. An actuation of the servo motor 8 causes a displacement of the plate 7 in the direction of the double arrow S according to FIG. 4 so that the drive shaft 6 and thus the centre of the crank 4 moves into a position dependent on the film transport speed for approaching the reversing points G1 and G2 of the grip joint 22.

For this purpose the servo motor 8 is connected to a camera control 9 which sends an electrical actuating signal to the servo motor 8 which depends on the adjusted film transport speed. This actuating signal can be sent steplessly for each desired film transport speed from the camera control 9 to the servo motor 8. Alternatively a discontinuous change in the position of the plate 7 takes place in dependence on fixed predetermined film transport speeds. Possibly, and with the arrangement diagrammatically illustrated in FIG. 4, a continuous change can also be carried out in the kinematics of the transport grip 2 in dependence on a continuously changing film transport speed by way of example for producing special picture effects so that also in this type of use an exact picture state as well as a smooth handling of the moving film 1 are ensured.

Alternatively or additionally this adjustment can also take place relative to the attachment 24 of the transport grip clip 20 on the control element 5 in that for example the attachment 24 is connected to a cam plate whose alignment is influenced by means of the servo motor 8.

The invention claimed is:

1. A film feed mechanism in a motion picture camera with at least one transport grip which, has a transport grip clip and at least one transport grip tip which through the kinematics of the transport grip, projects into the perforation of a motion picture film which is to be transported at a predeterminable film transport speed, moves the motion picture film intermittently, and runs through an elongated curved path which is closed and whose reversing points determine the stroke length of travel during the transport of the film, wherein the kinematics of the transport grip is changeable in dependence on the film transport speed and wherein the kinematics of the transport grip, is changeable by altering the relative position between the transport grip and a grip drive which is connected for articulated movement to the transport grip.

2. A film feed mechanism according to claim 1 wherein the grip drive comprises a drive shaft which is connected to a film transport motor and a crank which connects the drive shaft to an articulated grip joint of the transport grip clip, wherein a position of the drive shaft is changeable in relation to the articulated grip joint.

3. A film feed mechanism according to claim 2 wherein as the film transport speed rises, reversing points of the articulated grip joint, which connects the transport grip clip of the transport grip to the crank, are moved towards each other.

4. A film feed mechanism in a motion picture camera with at least one transport grip which, has a transport grip clip and at least one transport grip tip which through kinematics of the transport grip projects into a perforation of a motion picture film which is to be transported at a predeterminable film transport speed, moves the motion picture film intermittently, and runs through an elongated curved path which is closed and whose reversing points determine the stroke length of travel during the transport of the film, wherein the kinematics of the transport grip are changeable in dependence on the film transport speed and wherein the kinematics of the transport grip is changeable by shifting an attachment of an end of the transport grip clip opposite the transport grip tip on a control element, wherein the control element controls the projection movement of the transport grip and at least one locking grip which projects into the film sprocket at the end of a film transport step so that the locking grip releases the film when the transport grip projects once more into the film sprocket.

5. A film feed mechanism according to claim 4 wherein the attachment of the transport grip on the control element is moved relative to the axis of the control element as the film transport speed increases.

6. A film feed mechanism according to claim 4 wherein the control member can pivot about a control element axis, and wherein the attachment of the transport grip clip and an attachment of a locking grip lever, arranged on either side of a control member axis, control the transport grip tip of the transport grip and a locking grip tip of the locking grip through the control member.

7. A film feed mechanism according to claim 6 wherein the control member is formed by arms rotating about the control element axis with the attachments of the transport grip clip and locking grip lever.

8. A film feed mechanism according to claim 6 wherein the control member is formed by a disc with the attachments of the transport grip clip and locking grip lever.

9. A film feed mechanism in a motion picture camera with at least one transport grip which, has a transport grip clip and at least one transport grip tip which through kinematics of the transport grip projects into a perforation of a motion picture film which is to be transported at a predeterminable film transport speed, moves the motion picture film intermittently, and runs through an elongated curved path which is closed and whose reversing points determine the stroke length of travel during the transport of the film, wherein the kinematics of the transport grip are changeable in dependence on the film transport speed and wherein the kinematics of the transport grip is changeable by means of an actuating signal sent by means of a camera control to an electrically actuated control member which is connected to at least one of a grip drive, the transport grip and an attachment.

10. A film feed mechanism according to claim 9 wherein the control member consists of a servo motor connected directly to the transport grip clip.

11. A film feed mechanism according to claim 9 wherein the camera control changes the actuating signal continuously in dependence on the film transport speed.

12. A film feed mechanism according to claim 9 wherein the control member consists of a servo motor connected indirectly to the transport grip clip.

13. A film feed mechanism according to claim 9 wherein the camera control changes the actuating signal discontinuously in dependence on the film transport speed.

14. A film feed mechanism in a motion picture camera with at least one transport grip which, has a transport grip clip and at least one transport grip tip which through kinematics of the transport grip projects into a perforation of a motion picture film which is to be transported at a predeterminable film transport speed, moves the motion picture film intermittently, and runs through an elongated curved path which is closed and whose reversing points determine the stroke length of travel during the transport of the film, wherein the kinematics of the transport grip are changeable in dependence on the film transport speed, wherein the kinematics of the transport grip is changeable by means of a mechanical control member connected to at least one of a grip drive, the transport grip and an attachment, and wherein the mechanical control member comprises a centrifugal force regulator.

* * * * *